United States Patent [19]
Carey et al.

[11] Patent Number: 6,134,540
[45] Date of Patent: *Oct. 17, 2000

[54] SYSTEM, METHOD, AND PROGRAM FOR APPLYING QUERY REWRITE TECHNOLOGY TO OBJECT BUILDING

[75] Inventors: Michael J. Carey; Gerald G. Kiernan, both of San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/853,294

[22] Filed: May 9, 1997

[51] Int. Cl.[7] .................................................... G06F 17/30

[52] U.S. Cl. ........................ 707/2; 707/3; 707/4

[58] Field of Search ............................ 707/4, 2, 3; 704/4

[56] References Cited

U.S. PATENT DOCUMENTS

| | | | |
|---|---|---|---|
| 5,295,256 | 3/1994 | Bapat | 707/3 |
| 5,548,755 | 8/1996 | Leung et al. | 707/4 |
| 5,764,973 | 6/1998 | Lunceford et al. | 707/1 |
| 5,765,147 | 6/1998 | Mattos et al. | 707/4 |
| 5,774,692 | 6/1998 | Boyer et al. | 709/300 |
| 5,778,355 | 7/1998 | Boyer et al. | 707/2 |
| 5,797,136 | 8/1998 | Boyer et al. | 707/2 |
| 5,809,505 | 9/1998 | Lo et al. | 707/102 |
| 5,835,757 | 11/1998 | Qulid et al. | 707/10 |
| 5,864,840 | 1/1999 | Leung et al. | 707/2 |
| 5,930,785 | 7/1999 | Lohman et al. | 707/2 |
| 5,991,754 | 11/1999 | Raitto et al. | 707/2 |

FOREIGN PATENT DOCUMENTS

| | | |
|---|---|---|
| 0 320 266 A2 | 6/1989 | European Pat. Off. . |
| 0 702 312 A1 | 3/1996 | European Pat. Off. . |
| WO 95/01610 | 1/1995 | WIPO . |

OTHER PUBLICATIONS

Gio Wiederhold, "Views, Objects, and Databases," 8153 Computer, No. 12, New York, NY, pp. 37–44, Dec. 19, 1986.

Chih–Chin Liu, et al., "Object View Derivation and Object Query Transformation," Proc. Eighteenth Annual Int. Computer Software and Application Conference, Taipei, Taiwan, pp. 157–162, Nov. 9–11, 1994.

(List continued on next page.)

*Primary Examiner*—Hosain T. Alam
*Assistant Examiner*—Jean M. Corrielus
*Attorney, Agent, or Firm*—Pretty, Schroeder & Poplawski

[57] ABSTRACT

The system, method, and program of this invention enables an object language application (e.g., C++, JAVA, etc.,) to issue a query over a view and to receive back, as query results, handles to application type objects which can be further manipulated by the application. A view is defined herein as a collection of a view type, and a view type is defined as a class or type. Upon receipt of the query referencing a view type, a query engine generates a query plan that builds mock (i.e., proxy) application type objects in memory based upon the view types. The application can run methods on the application type objects or point to other application type objects from the handles, to the application objects, that are returned to the application; and these manipulations will be understood by the query engine. In a preferred embodiment, query rewrite optimizations are applied to the queries over views requiring object building in order to optimize the evaluation of the query and the building of view objects as query results. For example, when a query over a view is analyzed and it is determined that the query is not requesting a handle, and is not referencing a method, but only asks for values, no objects are built. Also, if a query traverses a reference type attribute, but the query can be transformed into a join or outer join operation between relational tables, then no object building is required. In these above described situations, the rewritten query can be pushed down to the database management system of the data source for resolution. If the query does request a handle or references a method, then some object building is required. However, query rewrite techniques can still be applied so that parts of the query are pushed down to the DBMS to minimize the number of objects that are built.

31 Claims, 9 Drawing Sheets

OTHER PUBLICATIONS

"Updating Relational Databases through Object–Based Views"; Thierry Barsalou, Arthur M. Keller, Niki Siambela, Gio Wiederhold; *Proc. ACM–SIGMOD International Conference on Management of Data,* Denver, Jun. 1991.

"The MultiView OODB View System: Design and Implementation;" Harumi A. Kuno and Elke A. Rundensteiner; University of Michigan Technical Report CSE–TR–241–95.

"Object Views: Extending the Vision"; Sandra Heiler, Stanley Zdonik; *Proc. IEEE International Conference on Data Engineering 90,* Apr. 1990.

"Objects and Views"; Serge Abiteboul, Anthony Bonner; *ACM–SIGMOD International Conference on Management of Data,* ACM Feb. 1991.

"On View Support in Object–Oriented Database Systems"; Won Kim, William Kelley; *Modern Database Systems: The Object Model, Interoperability, and Beyond, Part 1/Next–Generation Database Technology,* chapter 6, 1995.

"Towards Heterogeneous Multimedia Information Systems: The Garlic Approach"; M. J. Carey, L. M. Haas, P. M. Schwarz, M. Arya, W. F. Cody, R. Fagin, M. Flickner, A. W. Luniewski, W. Niblack, D. Petkovic, J. Thomas, J. H. Williams and E. L. Wimmers; *Proc. 1995, IEEE Workshop on Research Issues in Data Engineering,* Taipei, Taiwan, Mar. 1995.

"Queries and Views in an Object–Oriented Data Model;" U. Dayal; *Proc. 2nd International Workshop on Database Programming Languages;* editors, Richard Hull, Ron Morrison, and David Stemple, Gleneden Beach, Jun. 1989.

Third Generation Data Base System Manifesto, Mike Stonebraker et al, *Computer Standards & Interfaces,* 12, Dec. 1991.

"Object–Oriented Database Systems: Promise, Reality, and Future," Won Kim, *Proc. 19th International Conference on Very Large Data Bases,* Dublin, Aug. 1993.

"A Data Model and Query Language for EXODUS," *Proc. ACM–SIGMOD International Conference on Management of Data,* Carey, Michael; DeWitt, David; Vandenberg, Scott; Chicago, Jun. 1988.

"A Model of Queries for Object–Oriented Databases," Kim, Won; *Proc. 15th International Conference on Very Large Data Basses,* Amsterdam, Aug. 1989.

"A Query Language for the $O_2$ Object–Oriented Database System," Bancilhon, Francois; Cluet, S.; Delobel, C.; *Proc. $2^{nd}$ International Workshop on Database Programming Languages,* Hull, Richard; Morrison, Ron; Stemple, David, editors; Gleneden Beach, Jun. 1989, Morgan–Kaufmann Publishers, Inc.

"Query Processing in the ObjectStore Database System," Orenstein, Jack; Haradhvala, Sam; Margulies, Benson; Sakahara, Don; *Proc. International Conference on Management of Data,* San Diego, Jun. 1992.

"CQL++: A SQL for a C++ Based Object–Oriented DBMS," Dar. S.; Gehani, N.; Jagadish, H.; *Proc. International Conference on Extending Data Base Technology,* Advances in Database Technology—EDBT '92. Lecture Notes in Computer Science, Vienna, 1992. Springer–Verlag.

"Querying Object–Oriented Databases," Kifer, Michael; Kim, Won; Sagiv, Yehoshua; *Proc. ACM–SIGMOD International Conference on Management of Data,* San Diego, Jun. 1992.

"Object Query Language," Atwood, Tom; Duhl, Joshua; Ferran, Guy; Loomis, Mary; Wade, Drew; *Object Database Standards: ODMG—93 Release 1.1,* R.G.G. Cattell, editor, Morgan–Kaufmann Publishers, Inc., 1993.

"Experiences building the open oodb query optimizer," Blakeley, José; McKenna, William J.; Graefe, Goetz, *Proc. ACM SIGMOD International Conference on Management of Data,* Washington, D.C., May 1993.

"Observations on the ODMG–93 Proposal," Kim, W., *ACM SIGMOD Record,* 23(1), Mar. 1994.

"Enabling the Integration of Object Applications with Relational Databases"; Persistence Software, Inc.; http://www.persistence.com/persistence/ pageTwo.pages/techoview.htn; Apr. 2, 1997 1:40PM.

"Extensible/Rule Based Query Rewrite Optimization in Starburst," Hamid Pirahesh, Joseph M. Hellerstein, and Wagar Hasan, In *Proc. ACM–SIGMOD International Conference on Management of Data,* San Diego, Jun. 1992.

"Magic is Relevant," Inderpal Singh Mumick, Sheldon J. Finkelstein, Hamid Pirahesh, and Raghu Ramakrishnan, In *Proc. ACM–SIGMOD International Conference on Management of Data,* pp. 247–258, Atlantic City, May 1990.

"The Magic of Duplicates and Aggregates," Inderpal Singh Mumick, Hamid Pirahesh, and Raghu Ramakrishnan, In *Proc. $16^{th}$ International Conference on Very Large Data Bases,* Brisbane, Aug. 1990.

"A General Framework for the Optimization of Object–Oriented Queries," Sophie Cluet and Claude Delobel, In *Proc. ACM–SIGMOD International Conference on Management of Data,* San Diego, Jun. 1992.

"OMG. Object Services Request for Proposals," *OMG TC Document 94.4.18,* 1994.

"OMG. Object Query Service Specification, Joint Submission," *OMG TC Document 95.1.1,* 1995) .

ISO/IEC 9075:1992, Database Language SQL.

Microsoft. *Programmer's Reference, Microsoft Open Database Connectivity Software Development Kit,* 1992.).

Kiernan et al., "Extending SQL–92 for OODB Access: Design and Implementation Experience", ACM 0–89791, p. 467–480, Jan. 1995.

110 — row type db2dept  111 — (dno integer,
112 — dname varchar,
113 — dfloor integer,
114 — dstate character,
primary key (dno))

120 — row type db2emp  121 — (eno integer,
122 — ename varchar,
123 — esalary double precision,
124 — edid integer not null,
primary key (eno),
foreign key (edid) references
db2depttable (dno))

row type db2proj  (pno integer,
pname varchar,
primary key (pno))

*FIG. 1*

```
        212         223      224        225
         |           |        |          |
   alias db2dept for db2dept (db1.kiernan.dept)
   alias db2emp  for db2emp  (db1.kiernan.emp) — 226
   alias db2proj for db2proj (db2.wisneski.project)
     |
    222
```

*FIG. 2*

```
                310
                /
         type VTEmp  (this db2emptable) :
                    (no int,
                     name character,
                     sal int,         313
                     dept VTDept* inverse emps,
                     primary key (no)) as
     (
        select e.eno,
               e.ename,
               e.esal,
               (select d from db2dept d where d.dno =
                                                   e.edid)
        from this e      330
     )
         type VTDept (this db2depttable) :
                    (no int,         333
                     name character,
                     emps Collection<VTEmp*> inverse dept,
                     primary key (no)) as
     (
        select d.dno,
               d.dname,
               (select nest (e) from db2emp e where e.edid
                                                   = d.dno)
        from this e
     )            331     330    332
                   /       /      /
         collection VDept on VTDept (db2dept)
         collection VEmp  on VTEmp  (db2emp)
                   /       /      /
                  311     310    312
```

FIG. 3

```
                  410
                   /
         class VTEmp {
           private:
           db2emptable *e;
                              406      415
                               /        /
           public:   ┌─414
           int no ( )  { return (e->atts [0] ) ; }
           char *name ( )  { return (e->atts [1] ) ; }
           int sal ( )  { return (e->atts [2] ; }
           VTDept *dept ( ) ~416
              {         ┌─413
                Cursor<VTDept* > *c = oosql_exec ("select d from
                                /                 VDept d
                              405                 where d.no =
                                                  %d",
                                                  e->atts [3] ) ;
                return (c->firstElement ( ) ) ;         /
              }                                       417
         }       430
                  /
         class VTDept {
           private:
           db2depttable *d;

public:
           int no ( ) { return (d->atts [0] ) ; }
           char *name ( ) { return (d->atts [1] ; }
           Cursor<VTEmp*> *emps ( )
              {
                Cursor<VTEmp*> *c = oosql_exec ("select e from
                                                 VEmp e where
                                                 e.did = %d",
                                                 d->atts [2] ) ;
                return (c) ;
              }
         }
```

*FIG. 4*

Query:

select v.no, v.name
    from  VDept v
    where v.no < 10

Rewritten query:

select d.dno, d.dname
    from  Dept d
    where d.dno < 10

FIG. 5

Query:

select e.name, e.dept..name
    from  VEmp e
    where  e.no < 10

Rewritten query (step 1):

select e.ename, (select d.dname from db2dept d where
                   d.dno = e.edid)
    from  db2emp e
    where  e.eno < 10

Rewritten query (step 2):

select e.ename, d.dname
    from  db2emp e, db2dept d
    where  e.eno < 10 and d.dno = e.edid

FIG. 6

Query:

select ref e
  from   VEmp e
  where e.no < 10

Rewritten query:

select build_object (``VTEmp'', build_row (e.eno,
                            e.ename, e.esal, e.edid))
  from   db2emp e
  where  e.eno < 10

Query plan:

s1 = [ : select e.eno, e.ename, e.esal, e.edid from
       db2emp e where e.eno < 10 :]
  for all e in s1 do
   {
    e1 = build_object (``VTEmp'', build_row
                      (e->atts[0], ...)) ;
    result.add (e1) ;
  }

FIG. 7

Query:

select ref e
from VEmp e
where e.no < 10 and e.earned_vacation ( ) > 14

Rewritten query:

select   build_object ( " VTEmp ", build_row (e.eno,
                       e.ename, e.esal, e.edid))
from     db2emp e
where    e.eno < 10
and      build_object ( " VTEmp", build_row (e.eno,
                       e.ename, e.esal,
                       e.edid))   ..earned_vacation( ) > 14

Pushed Down Query:

select e.eno, e.ename, e.esal, e.edid
from kiernan.emp e
where e.eno < 10

*FIG. 8*

SYSTEM, METHOD, AND PROGRAM FOR APPLYING QUERY REWRITE TECHNOLOGY TO OBJECT BUILDING

CROSS REFERENCE TO RELATED APPLICATION

This application is related by common inventorship and subject matter to copending U.S. patent application Ser. No. 08/853,976 (Internal Docket Number ST9-97-064) entitled "A System, Method, and Program for Object Building In Queries Over Object Views," filed on even date herewith, by Michael J. Carey, et.al. assigned to the Assignee hereof and entirely incorporated herein by this reference.

This application is related by subject matter to copending U.S. patent application Ser. No. 08/853,270, now U.S. Pat. No. 5,897,634, (Internal Docket Number ST9-97-052) entitled "Optimized Caching of SQL Data In An Object Server System" filed on even date herewith, by Gopi K. Attalini et.al. assigned to the Assignee hereof and entirely incorporated herein by this reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to systems, methods and programs in the field of integrating object technology with database technology in a client/server environment, including, building objects by a query engine in response to a query by retrieving results from a database or other data source, and returning handles to application objects as query results for further use as such by the application; and applying query rewrite optimization techniques in this object building environment.

2. Description of the Related Art

Databases are computerized information storage and retrieval systems. A relational database management system (RDBMS) is a database management system (DBMS) which uses relational techniques for storing and retrieving data. Relational databases are organized into tables which consist of rows and columns of data. The rows are formally called tuples. A database can have many tables and each table can have multiple tuples and multiple columns. The tables are typically stored on random access storage devices (DASD) such as magnetic or optical disk drives for semi-permanent storage.

A DBMS is structured to accept commands to store, retrieve, and delete data. One widely used and well known set of commands is called the Structured Query Language (SQL). The current SQL standard is known informally as SQL/92. The definitions for SQL provide that a DBMS should respond to a particular query with a particular set of data given a specified database content, but the method that the DBMS uses to actually find the required information in the tables on the disk drives is left up to the DBMS. There can be more than one method that can be used by the DBMS to access the required data. The DBMS will optimize the method used to find the data requested in a query in order to minimize the computer time used and, therefore, the cost of doing the query.

In object-oriented databases (OODB), the database is organized into objects having members that can be pointers to other objects. The objects contain references, and collections of references, to other objects in the database, thus leading to databases with complex nested structures.

A query can declaratively specify the contents of a view. For relational databases, a view is essentially a virtual table having virtual rows and virtual columns of data. Although views are not directly mapped to real data in storage, views can be used for retrieval as if the data they represent is actually stored. A view can be used to present to a user a single logical view of information that is actually spread across multiple tables.

Object oriented (OO) views provide a similar service for object data as relational views do for relational data. An OO view is an alternative way of looking at data in objects contained in one or more queryable collections. An OO view is a named specification of a virtual result collection. Similarly to relational views, the bodies of some OO views in some OO systems can be queries that declaratively specify the contents of the view. In contrast with relational schemas, OO schemas are defined with a rich set of types that include multivalued attributes such as collections. These types directly model hierarchical and many-to-many relationships in the application's schema. For example, a department has a set of employees, an employee has a set of children, and so on.

Objects and Views are further discussed in the following:

"Updating Relational Databases through Object-Based Views"; Thierry Barsalou, Arthur M. Keller, Niki Siambela, Gio Wiederhold; *Proc. ACM-SIGMOD International Conference on Management of Data*, Denver, June 1991.

"The MultiView OODB View System: Design and Implementation;" Harumi A. Kuno and Elke A. Rundensteiner; University of Michigan Technical Report CSE-TR-241-95.

"Object Views: Extending the Vision"; Sandra Heiler, Stanley Zdonik; *Proc. IEEE International Conference on Data Engineering* 90, April 1990.

"Objects and Views"; Serge Abiteboul, Anthony Bonner; *ACM-SIGMOD International Conference on Management of Data*, ACM 2/91.

"On View Support in Object-Oriented Database Systems"; Won Kim, William Kelley; *Modern Database Systems: The Object Model, Interoperability, and Beyond, Part 1/Next-Generation Database Technology*, chapter 6, 1995.

"Towards Heterogeneous Multimedia Information Systems: The Garlic Approach"; M. J. Carey, L. M. Haas, P. M. Schwarz, M. Arya, W. F. Cody, R. Fagin, M. Flickner, A. W. Luniewski, W. Niblack, D. Petkovic, J. Thomas, J. H. Williams and E. L. Wimmers; *Proc. 1995, IEEE Workshop on Research Issues in Data Engineering*, Taipei, Taiwan, March 1995.

"Queries and Views in an Object-Oriented Data Model;" U. Dayal; *Proc. 2nd International Workshop on Database Programming Languages*; editors, Richard Hull, Ron Morrison, and David Stemple, Gleneden Beach, June 1989.

The integration of object technology and database systems has been an active area of research for the past decade. One important aspect of the integration of these two technologies is the provision of efficient, declarative query interfaces for accessing and manipulating object data. Compared to other aspects of object-oriented database (OODB) technology, such as integrating persistence into object-oriented languages like C++ and Smalltalk, queries were given relatively little attention in the early days of OODB research. See "Third Generation Data Base System Manifesto, Mike Stonebraker et al, *Computer Standards & Interfaces*, Dec. 12, 1991. In "Object-Oriented Database Systems: Promise, Reality, and Future," Won Kim, *Proc. 19th International Conference on Very Large Data Bases*, Dublin, August 1993, it is pointed out that most commercial OODB systems are quite weak in this regard. As the OODB field has developed, however, a number of proposals for OODB query languages have appeared in the database literature including the following:

"A Data Model and Query Language for EXODUS," *Proc. ACM-SIGMOD International Conference on Management of Data*, Carey, Michael; DeWitt, David; Vandenberg, Scott; Chicago, June 1988.

"A Model of Queries for Object-Oriented Databases," Kim, Won; *Proc. 15th International Conference on Very Large Data Basses*, Amsterdam, August 1989.

"A Query Language for the $O_2$ Object-Oriented Database System," Bancilhon, Francois; Cluet, S.; Delobel, C.; *Proc. 2nd International Workshop on Database Programming Languages*, Hull, Richard; Morrison, Ron; Stemple, David, editors; Gleneden Beach, June 1989, Morgan-Kaufmann Publishers, Inc.

"Query Processing in the ObjectStore Database System," Orenstein, Jack; Haradhvala, Sam; Margulies, Benson; Sakahara, Don; *Proc. ACM-SIGMOD International Conference on Management of Data*, San Diego, June 1992.

"CQL++: A SQL for a C++ Based Object-Oriented DBMS," Dar, S.; Gehani, N.; Jagadish, H.; *Proc International Conference on Extending Data Base Technology*, Advances in Database Technology-EDBT '92. Lecture Notes in Computer Science, Vienna, 1992. Springer-Verlag.

"Querying Object-Oriented Databases," Kifer, Michael; Kim, Won; Sagiv, Yehoshua; *Proc. ACM-SIGMOD International Conference on Management of Data*, San Diego, June 1992.

"Object Query Language," Atwood, Tom; Duhl, Joshua; Ferran, Guy; Loomis, Mary; Wade, Drew; *Object Database Standards: ODMG-93 Release 1.1*, R. G. G. Cattell, editor, Morgan-Kaufmann Publishers, Inc., 1993.

"Experiences building the open oodb query optimizer," Blakeley, José; McKenna, William J.; Graefe, Goetz, *Proc. ACM SIGMOD International Conference on Management of Data*, Washington, D.C., May 1993.

For example, O2 and ObjectStore (ObjectStore is a trademark of Object Design, Inc.) each provide their own flavor of an object query language. ObjectStore's query language is an extension to the expression syntax of C++. O2's query language is generally more SQL-like, and has been adapted into a proposed OODB query language standard (OODMG-93) by a consortium of OODB system vendors, but it differs from SQL in a number of respects. (See, "Object Query Language," Atwood, T.; Duhl, J.; Ferran, G.; Loomis, M.; and Wade, D.; *Object Database Standards:ODMG-93 Release* 1.1, Cattell, R. G. G., editor, Morgan-Kaufmann Publishers, Inc., 1993; and "Observations on the ODMG-93 Proposal," Kim, W., *ACM SIGMOD Record*, 23(1), March 1994.)

Another aspect of integrating object technology and database systems has been the building of objects from relational data. Persistence Software, Inc., provides an Object Builder for generating snap-in database objects which map relational database information into an object application. (See, "Enabling the Integration of Object Applications with Relational Databases"; Persistence Software, Inc.; http://www.persistence. com/persistence/pageTwo.pages/techoview.htn; Apr. 2, 1997 1:40 PM.)

Data Access Builder (DAX), which is a part of IBM VisualAge for C++ tools, is a GUI application that will connect to DB2 relational databases. For a certain set of tables, DAC will build C++ class definitions for rows in the table. Data can then be retrieved using a "Find By Key" function. For example, given an employee it will generate a C++ class having name, number and salary. One can issue a "Find By Key" functional call to retrieve the data for an employee, e.g., employee number 25.

An ObjectStore gateway, DB Connect, is a relational database gateway for the ObjectStore OODBMS from Object Design, Inc. (ODI). This product retrieves data from a relational database into an object-oriented database.

In summary, relational database management systems (RDBMSs) store data in tables that can be queried using languages like SQL. Tables can be defined intentionally using views. Instead of explicitly storing a set of rows, a view derives its contents from other views and tables. Users express queries over views in the same way that they express queries over tables. A view uses a query to specify its contents. A view facility can provide a similar service for Object-Oriented DBMSs (OODBMSs) as it does for relational DBMSs (RDBMSs).

Contrary to an RDBMS, an OODBMS manipulates application types in a seamless integration of programming language types and database types. Therefore, handles on application objects in the programming language environment can be returned as query results from an OODBMS. However, since views are derived types manipulated by the DBMS, queries cannot return handles to views as application types.

Relational databases have views that can be queried in a similar fashion as tables are queried. Likewise, it is desirable to be able to query object views in object oriented databases in a manner similar to querying objects. However, a problem exists because object-oriented databases can return handles on application objects, but if a view is to be returned, the object for the view does not exist and therefore its handle cannot be returned.

For example, in a relational database management system, if there is a table of "Employees" and a user wanted a view of "high salaried employees" called "RichEmployee" where employee salary is greater than 100,000, then the "RichEmployee" view can be manipulated in a same manner as the table "Employee" can be manipulated. However, the view "RichEmployee" is only known by the database, i.e., the user never gets a handle on any of the high salaried employee objects. The user only gets returned the attributes requested. In contrast, in an object-oriented database management system, besides getting the attributes, e.g., name, number, and salary, the user can also get a handle on the actual object. As such, the database object and the application object are really the same, and the user can get handles on them. As described, the implementation of views suffer problems because views are virtual, i.e., they don't actually exist. As long as the user performs the typical relational operations on views that will retrieve just the fields from the "RichEmployee" view, e.g., number, name, and salary, the user will not have any problems. However, the user can not get a handle on the "RichPEmployee" view and therefore can not perform other operations on this view, e.g., run methods that may involve other data outside of the framework of the "RichEmployee" view.

As with any database management system such as object-oriented or relational, query rewrite transformations and system-managed query optimization are essential features to ensure acceptable query performance. Query rewrite transformations for optimizing queries have been developed previously for relational DBMSs. See "Extensible/Rule Based Query Rewrite Optimization in Starburst," Hamid Pirahesh, Joseph M. Hellerstein, and Wagar Hasan, In *Proc. ACM-SIGMOD International Conference on Management of Data*, San Diego, June 1992; "Magic is Relevant," Inderpal Singh Mumick, Sheldon J. Finkelstein, Hamid Pirahesh, and Raghu Ramakrishnan, In *Proc. ACM-SIGMOD International Conference on Management of Data*, pages 247–258, Atlantic City, May 1990; and "The Magic of Duplicates and Aggregates," Inderpal Singh Mumick, Hamid Pirahesh, and Raghu Ramakrishnan, In *Proc. 16th International Conference on Very Large Data Bases*, Brisbane, August 1990. Many of these transformations also apply for Object Query Systems. However, new query rewrite transformations that apply specifically to Object Query Systems still need to be developed. See "A General Framework for the Optimization of Object-Oriented Queries," Sophie Cluet and Claude Delobel, In *Proc. ACM-SIGMOD International Conference on Management of Data*, San Diego, June 1992.

SUMMARY OF THE INVENTION

It is, therefore, an object of this invention to render views as application types from queries so that a query system can build, in memory, mock objects based upon view types which can then be returned as results and manipulated by the application.

It is a further object of this invention to provide query rewrite optimizations for queries over views requiring object building in order to optimize the evaluation of the query and the building of view objects as query results.

The preferred embodiment of this invention is used in a three tier environment having a client as the first tier, an object query service in a second tier, and a RDBMS at the third tier. A client, at tier one, issues a query over a view. The query engine of the object query service will pushdown as many predicates of the query as possible to a relational database management system (RDBMS), having its own query engine, on tier three. The RDBMS returns tuples to the object query service. As necessary, the object query service builds objects in its memory and resolves predicates, which have not been pushed down to the RDBMS, from its memory. The object query service returns, to the client, handles on query results which may contain application objects built or rendered in memory by the object query service. The query engine of the object query service on tier two will perform rewrite optimization techniques on the query in order to minimize the building of objects in the memory of the object query service.

It should be noted that both the object query service at tier two and the relational database management system have their own query engine. The use of the terms query engine, query system, and query service herein shall refer to the tier two system unless made specifically clear by the words or context that the RDBMS system at tier three is being referenced.

The various aspects of the system, method, and program of this invention are summarized as follows. A programmer creating an application in an object language (e.g., C++) may desire a specific view of the data from the relational database. The programmer may use a programming tool to create a view type definition which is stored in the query engine catalogs at tier two. The view type may be stored in the query engine catalogs at least for the duration of a transaction, however, other embodiments may keep the view types in the query engine catalogs for different durations, i.e., across multiple transactions, and in a different manner. A "view type" is introduced herein to preserve the distinction between classes and collections that is found in many OODBMSs and OOSs. A single view type can be used for multiple views, multi-valued view columns, as well as instance view columns. As such, the view type is analogous to the class or type and the view is analogous to the collection.

The tool will also create object language (e.g., C++) class definitions which are stored in an application file. Therefore, this same software tool is used to create both bindings for the programmer based upon the schemas and methodology of the desired view and view type. Once the schemas and methodology are received by the tool, such as through graphical representations of the schemas and methodology specified by a user using a graphical user interface (GUI), the tool generates the view type definition and the matching application class definition based upon the rules applied by the query system to create objects, from that view, in the memory at tier two used by the query system. A programmer could possibly create the view type definition and class definition by hand in a similar fashion as the tool does by creating a view and knowing the rules to create the corresponding class definition with the right constructor. A constructor is a special method on a type that is called to build or initialize an object of that type. A constructor for an employee type would be an employee constructor having parameters of number, name, and salary. To create an employee object, the constructor is called, and it will initialize number, name, salary, and other information. It is a different step than allocating storage for the object. Instead, it is associated with the initialization of the data portion of the object. If a view type is defined which is drawn from relational tables, there is a metadata catalog description of the view type and a class definition that has a constructor like mechanism that the query system is aware of, and will dynamically invoke. The parameters that the query system will pass to the constructor are based upon certain rules which are based upon what the query system will see in the view type definition. The query system will look at the view type definition, and based upon its contents, the query system will make certain assumptions and determine what information to include in the call to the constructor to re-build objects in the memory. Therefore, the metadata description, i.e., the view type in the catalog, and the object language (e.g., C++) class definitions have to match for object creation. The signatures, i.e., the parameters (e.g., number, name and salary) should also closely match to enhance optimization.

The query system creates instances of the objects in a cache memory when the query system receives a query that references a view. In one embodiment, the instances of objects are created every time that a query is received that references a view. In the preferred embodiment of this invention, the query is optimized in order to optimize the evaluation of the query and the building of view objects as query results.

When the query system creates instances of the objects, the objects are stored in a cache memory in the query system server at tier two. The objects stored in the memory are referred to as "mock" (i.e., proxy) objects since these objects do not contain any data themselves. They will redo the same computations that a view would do to derive its data. For example, if a "RichEmployee" view type is defined in terms of "Employee", in memory, the view type object of "Rich-Employee" would have in its data portion a handle on "Employee". All of the members of that type would be derived from "Employee". What is being built in memory is a real object, but the object derives it data from other things, e.g., rows. For example, an "Employee" object may be derived from a row in a database. The database row will be built in the memory of tier two. Then the view type object "Employee" will be built in memory in tier two and inside of it will be a pointer to the row in memory. The client on tier one gets a proxy, i.e., a remote handle on the instance(s) of the object residing in the query system server at tier two.

Copending Application Ser. No. 08/853,270, now U.S. Pat. No. 5,897,634 (Internal Docket Number ST9-97-052) entitled "Optimized Caching of SQL Data In An Object Server System", by Gopi K. Attalini et. al. herein incorporated by reference, discloses the caching techniques used for the instances of objects to ensure consistency of the data. In the simplest case, the server transactions on tier two are in sync with the server transactions on tier three. The cache on tier two is kept as long as a transaction on tier three has not been committed or rolled back. If both transactions are in sync on tier two and tier three, the cache is flushed on tier two if there is a commit or rollback on tier three. This guarantees that for a transaction having repeatable reads, which has a high level of locking, when data is retrieved from the cache on tier two, that data is consistent with the database at tier three. Since the cache at tier two is flushed if there is a commit or rollback at tier three, this guarantees that any updates committed for a transaction on tier three will be reflected in tier two for any subsequent transaction in tier two.

With the caching techniques described above, if a transaction at tier two has repeatable reads of an instance of an object, it is guaranteed to have the same values throughout the transaction at tier one. Likewise, if an applet had a handle to an object at tier two and it issued a commit, the cache at tier two would be flushed, and the applet should abandon the use of all objects manipulated during the transaction. Then, if the applet requests data from an object, it will get refreshed values for instances of the object.

The application uses its class definition to understand the data received back. That is why the class definitions stored in the application file and the view type definitions stored in the query engine catalogs are generated using the same rules and having a similar signature (e.g., matching attribute name and type) in order to maintain consistency between the two. The rules used to generate the class definitions and the view type definitions, and which are used also by the query engine for object building, are as follows:

Given a view collection v of view type V and an associated implementation M for V specified as a SELECT statement, if view objects of type V are to be created by a query over v, then If V is a view type, the object building procedure call used to build V has arguments whose ordering is that of elements in the FROM clause of M. If the ith element in the FROM clause is a view type, then a handle on the binding to the ith element is passed as argument to the object building procedure call. (In the examples below, the build_object function is used for this purpose.)

If V is a view type and the ith element in the FROM clause of M is a relational table, the object building procedure call used to create V has as its ith element a row type that is passed as argument to the call. The row type is a generic type that is built based upon the schema of a database row. The order of arguments is given by the order of columns present in the row type.

As such, the preferred embodiment of this invention is query driven and generates objects from views, instead of just generating objects from a mechanism based upon a one to one correspondence between a relational schema and an object schema which has been the typical approach used when relational technology is being integrated with object technology. In these previous object builders, a key function, which allows navigation of objects through pointers, is used to drive the object builder, and not a given query or view definition. In contrast, in the preferred embodiment of this invention, it is the given query and the view definition of the view type used in the query that drives the object builder.

The preferred embodiment of this invention also contains a query optimization function which determines in which situations or cases objects should be built. For example, when a query over a view is analyzed and it is determined that the query is not requesting a handle, and is not referencing a method, but only asks for values, no objects are built. Also, if a query traverses a reference type attribute, but the query can be transformed into a join or outer join operation between relational tables, then no object building is required. In these above described situations, the rewritten query can be pushed down to the database management system of the data source for resolution. If the query does request a handle or references a method, then some object building is required. However, query rewrite optimizations can still be applied so that parts of the query are pushed down to the DBMS to minimize the number of objects that need to be built.

BRIEF DESCRIPTION OF THE DRAWING

For a more complete understanding of this invention, reference is now made to the following detailed description of the embodiments as illustrated in the accompanying drawing, wherein:

FIG. 1 illustrates row types for relational tables;

FIG. 2 illustrates aliases for relational tables;

FIG. 3 illustrates view collections over relational tables, and represents view type definitions that would be stored in the catalogs of the query engine of an object query service;

FIG. 4 illustrates a C++ rendering of Employee Department Objects, and represents the object language class definitions that would be stored in the application file;

FIG. 5 is a simple query rewrite transformation for member names;

FIG. 6 illustrates query rewrite transformation for path expressions;

FIG. 7 illustrates query rewrite transformations for object building;

FIG. 8 illustrates query rewrite transformation for business object methods.

DETAILED DESCRIPTION OF THE PREFERRED EMBODIMENTS

Figure 9A:
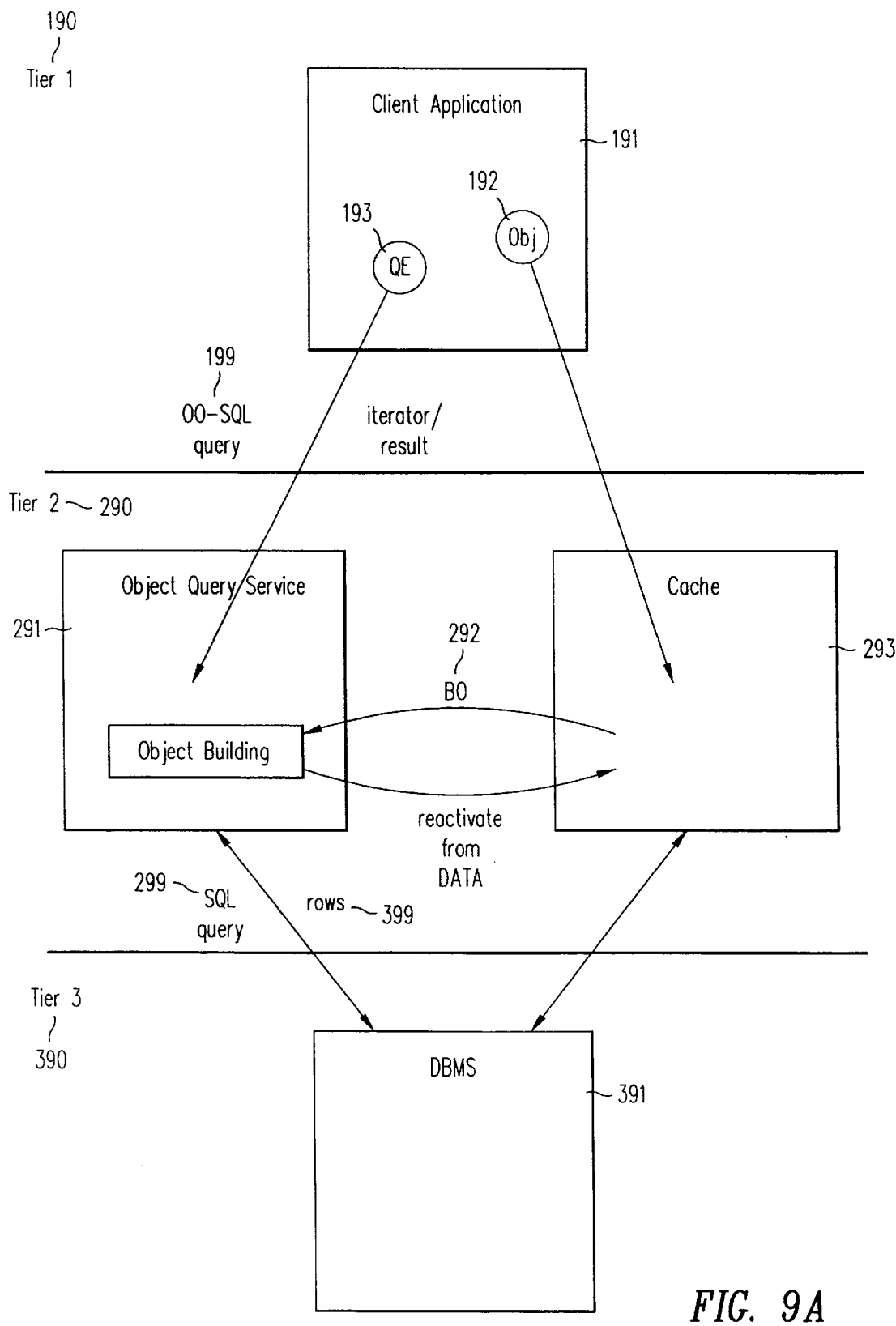
FIGS. 9A, 9B, and 9C are functional block diagrams of a processing environment incorporating the invention.

The preferred embodiment of this invention provides an object-oriented database (OODB) view facility based on object-oriented SQL (OO-SQL) queries. The preferred embodiment also uses relational-style query rewrite techniques along with other rewrite techniques that specifically address the optimization of building objects.

One reason for providing such an OODB view facility is to make it possible for different users or user groups to have different perspectives on the same object data, as with relational views. This has been the primary motivation for various object view facility proposals that have appeared in the research literature. (See, U. Dayal; Queries and Views in an Object-Oriented Data Model; In Richard Hull, Ron Morrison, and David Stemple, editors, Proc. 2nd International Workshop on Database Programming Languages, Gleneden Beach, June 1989; Morgan-Kaufmann Publishers, Inc. See also, Sandra Heiler and Stanley Zdonik; Object Views: Extending the Vision; In Proc. 6th IEEE International Conference on Data Engineering, pages 86–93, Los Angeles, April 1990. See also, Serge Abiteboul and Anthony Bonner; Objects and Views; In Proc. ACM-SIGMOD International Conference on Management of Data, pages 238–247, Denver, June 1991. See also, Michael Kifer, Won Kim, and Yehoshua Sagiv; Querying Object-Oriented Databases; In Proc. ACM-SIGMOD International Conference on Management of Data, San Diego, June 1992.)

In addition, having an OODB view facility makes it possible to make OODB data, which is usually stored as complex nested structures, appear as relational tables for access by legacy relational tools and applications (e.g., ODBC based applications and relational middleware products [See Microsoft; Programmer's Reference, Microsoft Open Database Connectivity Software Development Kit, 1992.]) Conversely, flat relational tables can be transformed into complex nested structures for use by object-oriented applications. This latter function is the focus in the description of the preferred embodiment of this invention.

A view facility of the preferred embodiment of this invention is part of a larger object query service used to retrieve data from object-oriented databases (OODBs) and object-oriented systems (OOSs). The overall OO-SQL object query service which incorporates the preferred embodiment of this invention is an OMG compliant object query service, (See "OMG. Object Services Request for Proposals," *OMG TC Document* 94.4.18, 1994; and "OMG. Object Query Service Specification, Joint Submission," *OMG TC Document* 95.1.1, 1995), which is based upon SQL queries and other technology for handling the requirements of object technology. The OO-SQL Object Query Service provides SQL based query access to object-oriented systems (OOSs) (e.g., VAC++, SOM, and Component Broker Series) and object-oriented database management systems (OODBMSs) (e.g., ObjectStore). In contrast to the ObjectStore, O2, and ODMG-93 query interfaces, OO-SQL is embodied in an OODB query interface that provides an upward compatible extension to SQL-92 (ISO_ANSI. Database Language SQL ISO/IEC 9075:1992, 1991). This enables programmers familiar with SQL to write OODB queries without learning an entirely new language. They simply learn about the object extensions. Also, this enables the many tools that have been built for relational systems to access OODB data via interfaces such as ODBC. (Microsoft. *Programmer's Reference, Microsoft Open Database Connectivity Software Development Kit*, 1992.)

The techniques used to resolve views in relational DBMSs are extended and adapted to object views in the preferred embodiment of this invention. Query rewrite techniques are used to resolve object queries over views which can have multi-valued view columns, instance view columns, and path expressions that traverse view columns. To preserve the distinction between classes and collections that is found in many OODBMSs and OOSs, the notion of "view type" is introduced. A single view type can be used for multiple views, multi-valued view columns, as well as instance view columns. As such, the view type is analogous to the class or type and the view is analogous to the collection.

The view facility supports the definition of view types that include reference and set-valued columns based on other views, thus allowing entire "view schemas" to be created. In the example given in FIG. 3, the dept member of the view type VTEmp is a reference to an object of view type VTDpet, and inversely, the emps member of the view type VTDept is a view collection that contains references to the view type VTEmp. Since the dept member of VTEmp is a single reference to a view type, we call this member an instance view column. The emps member of VTDept is referred to as a multi-valued view column since it is a collection.

Object-Oriented DBMSs (OODBMSs) offer a seamless integration of application types and database types. In contrast with queries over relational databases that return values that correspond to attributes in the rows of tables, queries over Object-Oriented databases can return handles to application objects as query results. Returning handles on application objects is a problem for queries over views. Views are understood by the query engine, but have no representation as application types. In the preferred embodiment of this invention, the problem of returning view types as application objects is addressed. The process of rendering application objects from views and view types is referred to herein as "object building". Object building is performed under the control of the query engine during query evaluation. There are two classes of queries that are affected by object building: 1) queries that return view types as query results, and 2) queries that invoke methods on view types. Both types of queries are addressed in the preferred embodiment of this invention. In addition new query rewrite algorithms are used to optimize these queries.

Description of a Three Tier Environment:

FIG. 9A shows a high level view of a three tier environment of the preferred embodiment of this invention that is representative of the next wave of client/server environments. Instead of just two components or tiers, a client and a server, there are three components, or tiers, 190, 290, 390. The server is the same, i.e., a database management system 391 is on tier three 390. However, what was previously referred to as the client is now an object server, referred to as a Component Broker Series Server or business objects server, which contains the object query service 291 on tier two 290. The client application 191 on tier one 190 of this three tier environment is mostly comprised of just presentation logic, such as that provided by a Java Applet on a web browser, e.g., a NETSCAPE browser. Most of the previous application logic is on the object server on tier two. The communication protocol between the application 191 on tier one 190 and the object server on tier two 290 are remote calls, i.e., the methods on objects (e.g., for employee object it may entail methods relating to hire, fire, raise salary, etc.). For example, CORBA (Common Object Request Broker Architecture, from OMG, Object Management Group) can be used between tier one and tier two. This includes OO-SQL, object oriented SQL 199, used by the application to run queries.

The client 191 will use the business objects 292 on the object server at tier two 290 to do most of its processing, which is primarily presentation work. For example, if tier one issues the statement "select b from employee business object b where b.no=21", the client application gets a handle on employee 21 by opening a cursor on the result and fetching the first thing out. Employee 21 is an object on tier two on the object server, and the client on tier one gets a proxy OBJ 192, i.e., a remote handle on that employee object residing in the object. As another example, a JAVA applet at the client 191 on tier one may issue a query 199 such as "select e from employee business object e where e.salary is greater than 10". Returned would be a handle 192 on business objects from the memory cache 293 on tier two 290.

QE 193 is a query evaluator object. QE 193 and OBJ 192 are proxies to tier two 290 that are being managed by CORBA. The client application has a handle, QE 193, on the query evaluator that is residing in the object server. The application 191 submits a query, and the query service 291 determines what to do to render that result, e.g., by submitting a query to the DBMS, e.g., a RDBMS, 391 on tier three 390. The query service 291 gets a result from the RDBMS, performs an object building step, which accesses the cache 293, and gets business objects back from the reactivation of the database row. The results are now objects in the cache 293 and are returned as results to the application as handles. OBJ 192 is a handle on an object view type in the memory.

The preferred embodiment of this invention also involves interactions between tier two 290 and tier three 390. The communication between the tier two object server 290 and the server 391 on tier three are SQL 299 and tuples, i.e. rows 399.

The object server takes all of the existing legacy data (such as hierarchical data, e.g. IMS, or relational data, e.g., DB2) and makes the data look, perform, and be used, like objects. The user can now request a user's specified employee view, and the object query service 291 has to figure out what to do to render it as objects in memory. If the data is coming from tables, objects may have to be built. It is important to note that the object server of the preferred embodiment of this invention has a query orientation. Other approaches have pulled data from the database and deposited the data into a middle server as objects. However, in these other approaches, once the data appeared as objects in the middle server, the objects no longer were capable of having queries run against them. In the business object server of the preferred embodiment of this invention, there is an integrated environment where pointers in an application can be followed as well as running queries.

The illusion being created is that of an object database where the objects live in the memory when actually the data is coming from a relational database, (or any other type of non-object-oriented database such as hierarchical). The communication between the tier two 290 object server and the relational database on tier three is completely automated. The query system 291 in the object server determines what queries (or portions of queries) to send off to the relational database to solve the query, and what queries (or portions of queries) require the query system in the object server to build objects in the memory.

To match the functions of each tier with corresponding computer capability, typically, tier one is a network computer model or workstation, such as a network computer running NETSCAPE, tier two is a workstation such as one running UNIX or AIX, or even Windows, and tier three is a mainframe such as one running MVS. However, all three tiers could be run on mainframes or workstations. In addition, the three tiers do not have to reside on three separate machines. There may be one, two or three machines for these three tiers, i.e., one or more tiers may be run on the same machine.

Figure 9B:
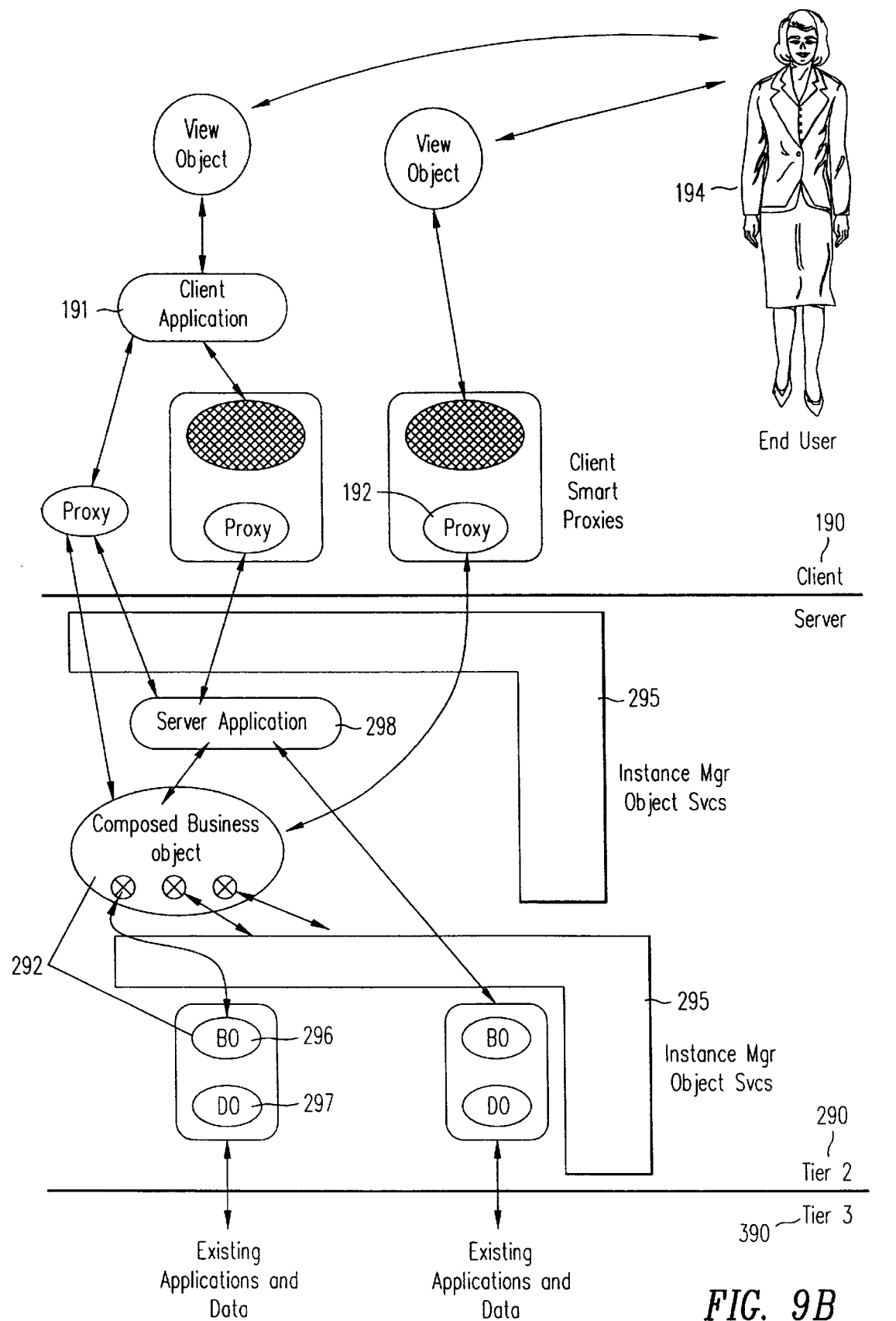

FIG. 9B illustrates in more detail the three tier environment having a client 191 on tier one 190, an object server on tier two 290, and a relational database on tier three 390. The object query service 291 of this invention resides in the Instance Manager Object Services 295 of the object server on tier two. Some embodiments may have different Instance Manager Services 295 for composed business objects, for relational table business objects, and for IMS business objects, etc.

The end user 194 would be working at the client using an object-oriented language, such as C++ or a Java Applet, on a browser, i.e., the client application 191 which is comprised mostly of presentation logic. The biggest part of the previous client application logic now resides in the business objects 292. The business objects take the place of a large portion of the client application logic typical of a two tier client/server environment. The protocol between tier one and tier two is the business object and operations on the business object, and the protocol between tier two and tier three is SQL and rows.

The user would get proxy objects 192 that point to objects on the server which are business objects composed of a business object (BO) portion 296, i.e., an external interface part, and a data portion (DO) 297 of the object. The data portion is retrieved from the relational database on the third tier. The server application 298 is the ORB or Component Broker Series machinery on the server that gets and manages the request on behalf of the proxies on the client. ORB is an object request broker. For example a get_salary from an employee object would be handled through the server application to dispatch the request and to run the actual code to implement the method on the server. A Composed Business Object 292 is composed of multiple other objects. This invention, however, does not distinguish between composed business objects and other business objects. In the preferred embodiment of this invention, a view type can aggregate multiple underlying objects, but they are not treated differently. The query system of this invention would create objects 292 designated in FIG. 9B as BO and Composed Business Objects.

Figure 9C:
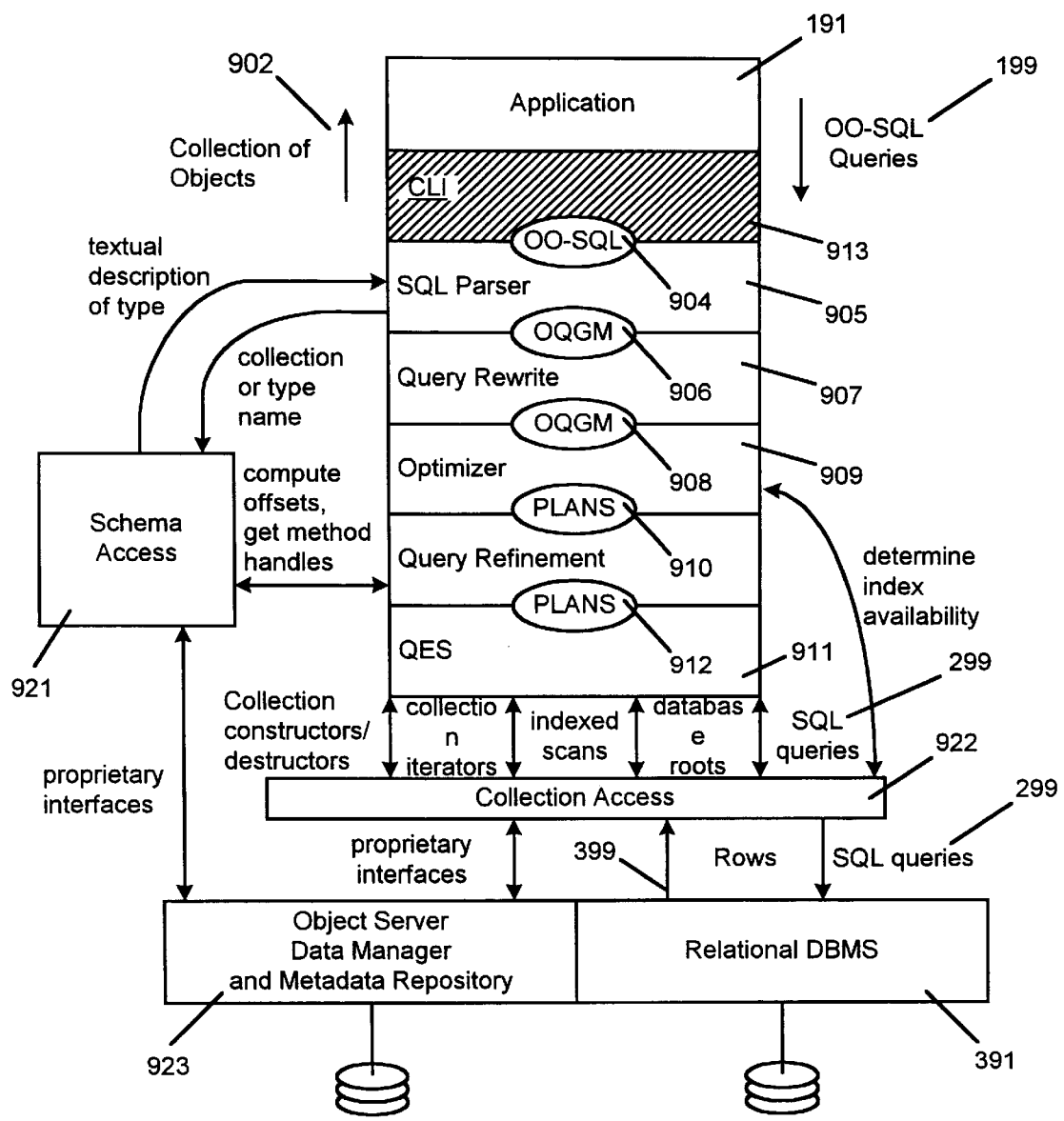

FIG. 9C illustrates the portability aspect of the query system including the schema access component 921 and the collection access component 922. The components of the query engine used in the Object Query Service (291, FIG. 9A) including the parser 905, query rewrite 907, optimizer 909 and query evaluator subsystem 911, are similar to the components of the query engine used in the relational database management system (RDBMS) 391.

With reference to FIG. 9C, the query engine of the object query service is described as follows. The application 191 issues OO-SQL queries 199 through a Call Level Interface (CLI) 913, such as CORBA. The schema access component 921 gets the views and the schema of the business objects, and information necessary to run methods from the CBS Data Manager and Metadata Repository 923 which contains the catalogs for the query engine. The query engine parses 905 the query 904 and generates an internal representation of the query called a query graph, i.e. a data structure OQGM (object query graph model) 906. The OQGM 906 is passed to the query rewrite component 907. The query rewrite engine 907 applies transformations to the query. These query rewrite transformations 970 include the standard relational query rewrite techniques that were developed for relational systems and the query rewrite transformations for object building of the preferred embodiment of this invention.

Query rewrite is also affected by object building because query rewrite has to realize that it may have to build an object in certain situations. Object building typically will occur in two situations, such as when a user asks for it by requesting a handle on an object, or when a method is being run during a query and the only way the query engine can run the method is to build the object.

Object building also affects query optimization and query evaluation. The calls to build the objects occur during query evaluation. During query evaluation, a step is added to build the objects in memory in order to return them to the application, if needed. Query evaluation calls the object building function which is inserted into the query by query rewrite. Query processing also determines whether an object needs to be built and in which situations it can get by without building the objects.

After the rewrite phase, 907, the result is a query graph 908 that is used by the optimization phase 909. Each query is then translated into an executable plan 910. If the data comes from a relational database, the plans contain SQL queries. Once translated, a query plan (QPL) 912 is passed to the Query Evaluation Subsystem, (QES) 911, where the SQL queries 299 in the plan go to the relational DBMS 391. Rows 399 are returned as the query result. If the data does not need to come from a relational database, then the Query Evaluation Subsystem (QES) 911 runs the plans 912 against collections of objects. Returned to the application 901 (which could also be a user interacting directly through an interface) through OO-SQL is an ordered collection of objects 902 (e.g., CORBA business objects). Query results include pointers to objects in stored collections. These pointers are simply virtual memory addresses in an application program, so they must be valid pointers in the application program's workspace in order to be useable for further object language (e.g., C++, JAVA) based navigation and data manipulation.

The preferred embodiment of the invention could be included in any Object Query Service for any Object-Oriented System (OOS) (e.g., VAC++, SOM, and Component Broker Series) and Object-Oriented Database Systems (OODBMS) (e.g., ObjectStore) and for any object-oriented approach for utilizing legacy data (e.g., relational data or hierarchical data). For example, IBM's DataAtlas and Team Connection products will be embedding the ObjectStore OODBMS in them, and will be using OOSQL for query access to data. The preferred embodiment of the invention is described with reference to the Component Broker Series product which is being developed for the next wave of client-server applications and which is based upon a three tier organization. The Component Broker Series object query service will be using the object view technology described in the preferred embodiment of this invention to derive business objects from legacy systems which include relational DBMSs. Client applications will be able to query collections of business objects that are derived from "relational tables".

The invention is also applicable to any object language, including but not limited to Java, C++, IDL, which can have systems that incorporate the techniques disclosed in the preferred embodiment of this invention. For example, a C++ application would interact with the database by generating C++ classes, i.e., proxy objects for items, from the application's perspective, that are in the database, which can be generated by tools. The C++ application program interacts with the C++ classes and can query over them and navigate them. This can be done in any object language.

Object Building in Queries over Object Views

When the object query service determines that, for a given query, objects need to be built to either return them as results, or to run methods that are used in predicates, the query engine produces an optimized query plan that includes object building to create application objects that correspond to views. Returned from object building are handles to the corresponding application objects.

The rules used by the query engine for object building are driven from metadata in the form of views and view types. The rules for object building from metadata are first given, and then a set of illustrative examples are presented.

Given a view collection v of view type V and an associated implementation M for V specified as a SELECT statement, if view objects of type V are to be created by a query over v, then If V is a view type, the object building procedure call used to build V has arguments whose ordering is that of elements in the FROM clause of M. If the ith element in the FROM clause is a view type, then a handle on the binding to the ith element is passed as argument to the object building procedure call. (In the examples below, the build_object function is used for this purpose.)

If V is a view type and the ith element in the FROM clause of M is a relational table, the object building procedure call used to create V has as its ith element a row type that is passed as argument to the call. The row type is a generic type that is built based upon the schema of a database row. The order of arguments is given by the order of columns present in the row type.

Row Types

OODBMSs distinguish between type and collections of element types. If a collection is a type extent, then it contains all instances of a given type. Relational DBMSs do not introduce such distinctions. Although a table has a schema, a table isn't considered to be a type. If tables are to be used as parameters to mapped type, these must be associated to a type similarly to other collections in an object-oriented environment. As such, row types are defined where the arguments correspond to columns of the row/table. A table would then contain all instances of the defined row type. Examples of row types are given in FIG. 1.

Referring to FIG. 1, department table row type, row type db2dept 110, has a department number 111, name 112, floor 113, and state 114. The department number 111 is specified as the primary key 115. The employee table row type, row type db2emp 120, has a number 121, name 122, salary 123, and department id 124 which conveys which department the employee works in. FIG. 1 illustrates a relational view. To relate employee with department one would write a SQL query that would state that employees department id 124 is equal to department number 111 of the department.

Using object mapping, a handle on an object, which is a pointer, department pointer "dept" to view type department, would be returned to the application. If in writing an application, the name of the employee and the department name is desired, the pointer in the employee object is followed to get the department name from the department object. This is a more direct way for an application to interact with the database. It is more natural for a C++ programmer, or any other programmer using an object language, to view the database as application types as opposed to flat relational tables.

Once a table type has been defined, it can be referenced in an alias, as given in FIG. 2. FIG. 2 presents aliases that define a set of relational tables; the alias names 212,222 can appear in OO-SQL mapping queries or mapped collections. An alias creates a name for a remote table on the local object query service. For example db1 224 is a database name, kiernan 225 is the owner, and emp 226 is the table name. The table type is db2emp 223. The schema specifies table names as types. The table db1.kiernan.emp must have the same columns of the same type as the table type db2emp. The statement "alias for db2emp for db2emp (db1.kiernan.emp)" tells the system that the table db1.kiernan.emp should be part of the query or be involved in a view.

View Types and Class Definitions

FIG. 3 defines collections that present an object-oriented mapping of relational tables. FIG. 4 defines the application types (i.e., object language (e.g., C++) class definitions) that correspond to the view type definitions given in FIG. 3. These mapped types can be retrieved as instances of application objects. For example, the following query returns instances of type VTEmp contained in the view collection VEmp with salaries greater than 10: select e from VEmp e where e.sal>10.

There is an application type defined in an object language (e.g., C++ or CORBA IDL) which corresponds to view type VTEmp. (The application type is generated, along with the view type, by a tool.) The query system assumes that the application type constructor (for object building) accepts a list of arguments that are handles to objects given in the mapped type's "from" clause. In the above query, the type constructor for VTEmp accepts a handle on a row of a table identified by the correlation variable "e". The organization of the row object is given by the table type. In the above example, a row object for "e" has columns no, name, salary, did.

In FIG. 3, the VTEmp type has a member "dept" that is a reference to an instance of the mapped type VTDept. The implementation of this column is a subquery that returns a handle on a row of table db2dept that corresponds to the employee's department. Similarly, mapped type VTDept has a member "emps" that is a collection of instances of mapped type VTEmp, and it is implemented using a subquery. The subquery forms the set of employee rows that correspond to employees in a department "d".

FIG. 3 represents view type definitions that would be stored in the query engine catalog of tier two. FIG. 4 represents the object language class definitions that are stored in the application file.

The object language class definitions are also accessible to the object query server through CORBA dynamic method invocation. If the object query server had a handle on an object it could also invoke the methods dynamically. For example, if the user on tier one issues a query "give me a handle on employee number 21", the user gets the handle by having a variable in memory "e" pointing off to a proxy on employee 21. A user may then request, e.g., using Java, "salary=e.get_salary()" which invokes a method on tier one on a proxy. This will involve a private protocol, which is CORBA compatible or compliant, to tier two. Tier two will use ORB to perform the operation on behalf of the user on tier one and will call the get_salary() method on the equivalent object in tier two. The object server on tier two will have a handle on the object in the memory of tier two, and it will call the get_salary() method for tier one. On tier two, besides running queries to retrieve results, once it gets the object in memory, it uses the methods to manipulate the objects upon a reference by the user. The user references them through the class definitions. Once a user has a handle on an object, the user can then get the object's attributes, e.g., get_number, get_name, get_salary.

In FIG. 4 class VTEmp 410 and class VTDept 430 are the object language (e.g., C++) class implementations for the corresponding view types, type VTEmp 310 and type VTDept 330 shown in FIG. 3. The query system will use the view types of FIG. 3 to determine what it needs to do to build an object in memory that will function with the implementation given in FIG. 4. Contrary to relational database queries where the results are passive, the query system of this invention returns a handle on an object that can reference other objects. From one piece of data, the user could possibly reach limitless amounts of other data from the database. As such, the returned handles on the objects can invoke database operations indirectly, i.e., not explicitly using the query interface. The capability to present the data as if it resides in memory is accomplished through the methods of the types as shown in FIG. 4. A method is denoted as () for the object language used in FIG. 4. For example, a simple method is sal(). If there is a handle on the employee object, one can then get the salary. In this simple method, the data in the employee object already contains the salary. As such, the result is returned easily. However, in another example, an employee object may be rendered for which the user desires to find the department. The department may not be part of the data of the employee object, and the department object may not presently be in the memory. The dept() method would then have a pointer to a name within a department object via the method "e.dept().name() ". In implementation, the department object would be rendered or reactivated in memory.

As shown in FIG. 3 type VTEmp 310 and type VTDept 330, are the view types, view type employee and view type department, defined in the query language. Also shown are collections of the view types. VEmp 311 is a collection of view type employees (VTEmp) 310. It draws its results from a table, db2emp 312. Likewise, VDept 331 is a collection of view type department (VTDept) 330. It draws its results from a table, db2dept 332. One of the functions shown in FIG. 3 is that of generating a nested schema in the views from flat relational schemas. For example, view type employee (VTEmp) 310 has a pointer (VTDept*) 313 to view type department (VTDept) 330, and view type department (VTDept) 330 has a set or collection 333 of employees. VTDept 330 has a collection of pointers (Collection<VTEmp*>) 333 to employees. If there is a department object, one can iterate over the collection of employees to get the employees of a specific department i.e., a department object instance.

In a cache at any given time, there may be C++ objects that represent some of the data and other C++ objects that represent a different view of the same data. A problem arises as to what to do with all of the different objects that are interrelated in a cache. C++ code needs to be generated that allows the application to manipulate these objects. The preferred embodiment of this invention provides a system, method, and program for generating object language (e.g., C++) objects and methods that will allow a programmer to operate on views of data in terms of the programming objects. The objects will behave and look like, i.e., be identical to, types in memory that the application is manipulating in its application space via C++, Java, IDL, or other object language.

To get the generated C++ definitions shown in FIG. 4, the following scenario would typically take place. Given a relational database, a C++ programmer would use a GUI based tool to generate view type definitions (FIG. 3). As the programmer writes the application, the programmer would ask for the C++ classes (FIG. 4) that implement the view types (FIG. 3). The tool would automatically generate the classes which the programmer can make use of. The tool would examine the view definition and use the view definition to generate the class definition. In a preferred tool embodiment, the tool would have a graphical user interface (GUI) that would allow the user/programmer to graphically represent relationships among data types in the relational database. The tool would then automatically generate the view type definitions and the object language class definitions from the user's graphical representation.

The preferred embodiment of this invention enables a query system, which knows nothing about the specific object language which has been used to generate the specific object language class definitions, to render objects in the memory based upon view definitions. The system, method, and program of this invention gives the user a view that objects are residing in the memory persistently. It should be noted that, in relational systems, views are virtual tables. When they are referenced in queries, the query rewrite component and the optimizer convert the query over the view to an equivalent query over the base data in the database. As such, instances of the view never have to be actually created or materialized, i.e., stored in memory. Therefore, instances of the view do not actually exist. The preferred embodiment provides a framework as if the views, in terms of objects, actually do exist. In an object-oriented programming world, instances of objects are materialized in memory. This enables a programmer/application to use the objects in memory, run methods on them, and point to objects from other objects. The preferred embodiment of this invention connects views into this object-oriented programming world. Although in the preferred embodiment the view objects still only exist in a virtual sense, proxies are given for them so that a user can manipulate them in an application as if they actually did exist like other objects.

The query engine can handle objects of views in a similar manner that relational views are handled. That is, just as a user can manipulate views as though the virtual relational views existed, a user can manipulate objects as though they existed. Similarly, just as the database engine rewrites and optimizes queries over views into queries over the base data, the query engine also rewrites and optimizes queries over objects. However, unlike relational views, once objects are handed out in the memory to users, the users can navigate to other objects, and perform other manipulation of the objects, and such manipulation will be understood by the query engine. Once the query engine gives off a handle to an object in the memory to an application, then the application can do anything the application wants with the object. Although it is out of the realm of the query engine, the object still has to behave as it is suppose to. For example, if the virtual object has a reference to a department, and a user traverses the reference, some department still has to appear even though the object is virtual and the query engine is not present at the time.

For example, queries deliver data from the relational views and a user/application can copy the data out of the views. But once the application has the data from the view, the data from the view is no longer connected to the data in the database. If the information is used later by the application, it is the same information that was originally retrieved from the view. However, in the preferred embodiment of this invention, objects are created in the application program that retain their connection to the database. The application objects are instances of the view type, and when their methods are invoked, the connection is maintained to the base data. For example, if an application tries to get a department of an employee, this is a method 416 (FIG. 4) in the object, the body 413 of this method specifies that a query 405 should be issued to find the corresponding department. In simple situations, such as finding employee information, instead of copying the data and materializing the view, a reference (i.e., pointer) is stored inside the view type to the underlying object. The information is retrieved out by dereferencing the pointer. In more complicated retrievals, if the information can not be retrieved by merely dereferencing the pointers, then a query is issued to find the corresponding data.

The above is accomplished by inspecting the view definition (FIG. 3) and generating the correct set of classes. The data is not refreshed, but, instead, the data is bound to the data that it came from. As such, the links between objects are kept track of. For example, if "high salaried employee" is bound to "employee", then this link is kept track of. If the salary of a "high salaried employee" is desired, then the data of employee cached in the memory is looked at. It is not necessarily retrieved from the database. If there are repeatable reads and locks on the data, and the data is brought in during the transaction, then the data cached in the memory from which the virtual type is based on, is consistent with respect to the transaction. The cache is flushed when the transaction is committed or aborted. Consistency is then guaranteed for the duration of the transaction. An optimized caching technique is further disclosed in copending U.S. Application Ser. No. 08/853,270, now U.S. Pat. No. 5,897, 634 (Internal Docket Number ST9-97-052) entitled "Optimized Caching Of SQL Data In An Object Server System," by Gopi K. Attalini et al which is herein incorporated by reference.

In object oriented environments, methods on objects are called in order to perform operations. Since all data and methods are encapsulated in objects, one only needs to know to call a method. A method can traverse a pointer to another object to get related data. A user calling a method will not necessarily know the other data being used by the method. For example, there may be a method, named "budget increase" associated with a department object. The method may traverse a pointer to a manager of a department and take an entire budget increase and add it to an employee's salary. A person calling the method would not know what the method actually does. An application program may be written to manage budget increases and also, separately, to manage employee data. The application may not realize that the value of an employees salary may be changed as a result of other department object manipulations such as from the "budget increase" method. As such, one would not know to refresh the employee data since the value has been changed. The relationships are maintained so that if a value of an object is updated, such as from a method, the updated value will be retrieved if a later use of that value is needed. Instead of materializing an instance of the view type, inside the view type implementation a pointer is stored to the underlying object. The view type object (e.g., VTEmp 410, FIG. 4) delegates the job of getting the attributes (e.g., number, name, salary) to the underlying (EMPLOYEE) object. It cannot do this for the department object because the object has a department id. Instead, it issues a query 405 (FIG. 4) to select the department d where the department number is equal to %d, and %d is delegated to get the department id of the employee object. It then goes off and does the query to find the underlying pointer. The pointer network and delegation approach for getting data values out make it well suited to a caching environment.

As another example, an object may be covered by more than one view type. For example, there may be a California Employee View Type and a High Salaried Employee View Type. Both view types may involve the same employee object. The employee may be from California and have a high salary. If a method in the "high salary" employee view type changes a value in the employee object, then the change will be reflected in the object and the changed value will be used if it is referenced by the California employee view type. A change in one view type will propagate to other view types.

Given a query that requires object building, the query engine has to render the objects in memory. The query engine does this without having any knowledge of the object language (e.g., C++) class definition. Rendering the objects by the query engine is based solely upon the view definition.

To do this, the query engine relies on two rules. The query engine looks only at the FROM clause. If there is a query that states "select e from VEmp e", a handle on the object e is being requested. (The query could also have stated "select ref e" which unambiguously states that a handle e is desired on the obects VEmp pointed to by e. Ambiguity may arise if there is also a method "e" or column "e" in the view VEmp. As such, the query "select e from VEmp e" would be requesting the column attribute and not a handle. In this example, however, both select statements are requesting a handle to an object in the VEmp view collection bound to correlation e, since there is no column "e" in VEmp.) A view employee type object has to be built along with a view employee collection. The internals of the object have to be determined in order for it to operate. By looking at the From clause, a number of arguments will be passed to the constructor of the object which is equal to the number of elements in the FROM clause. In this case, the employee object is built from one thing, a db2emp object, so a handle is passed on just this one thing to build a view type employee object. This e corresponds to a db2emp object. The two rules have been fully stated above. In essence, the two rules are: 1) If the element in the FROM clause is view type object, it passes a handle to the object type constructor; and 2) If the element in the FROM clause is a row type from a relational table, it builds the row in the memory and passes a handle on the row to the constructor.

For example, view type employee (VTEmp 410, FIG. 4) has a private section of this data type which has a reference to "e" which will be created by the query engine. A private section is hidden inside an object. It is usually related to storage. The private section is the data part of the class definition that the methods are depending upon to render their results. The public section is the signature of the object for the class that a user will invoke to get the values, e.g., get employee number, name salary, etc. The class implementation, either by a tool or by a programmer, has to be in sync with the assumptions that the query system is going to make, i.e., they would have to follow the above stated rules.

For example, in the employee view type (VTEmp 410 FIG. 4), there is a handle e on an employee row. To get an employee number, no() 414, it would return the [0] attribute 415 of the e row type 406. In the employee table type (120, FIG. 1) the employee number (eno, 121, FIG. 1) is the 0th attribute in C++ notation. (In C++ notation, counting begins with 0 instead of 1).

To get the related department (dept(), 416), the foreign key e.did is being used. A dept() for an employee gets the handle on employee's department. A query 405 is run to retrieve the department using the employees department id which is the third attribute 417 in C++ notation. To get the number (no(), 414), the query engine will go to e, 406, and to the 0th attribute 415 to get the value to return. If there is a reference in a view type, the view type employee object in memory will contain a reference/pointer to db2emp 120, FIG. 1.

The two rules for building and materializing an object in memory and for building compatible object language class definitions from views are further described. As an example, V is a view collection and VEmp is a view collection of view type employee (VTEmp). The associated implementation M is the view type (VTEmp) specified as a select statement. The object building procedure call used to build V has arguments whose ordering is that of the elements in the FROM clause of M. In the case illustrated in FIG. 3, e is a row type.

In the first rule, as the query engine examines the FROM clause, if the ith element in the FROM clause is a view type, then a handle on the binding to the ith element is passed as an argument to the object building procedure call. Basically, before doing the object building for view type (e.g., view type employee VTEmp), the query engine will do the object building for whatever the view type (VTEmp) is dependent upon, and will put that as the ith argument to the object building call.

In the second rule, if V is a view type and the ith element in the FROM clause of M is a relational table, (i.e., a row type), the object building procedure call used to create V has as its ith element a row type that is passed as an argument to the call. In this case, VTEmp is built upon db2emp which is a row type. Before the handle is passed to the row type, the row type has to be built. The row type is a generic type that is built based upon the schema of the row type. The order of arguments is given by the order of columns present in the row type. The schema is looked at to build the row type such that e.number is the first item, e.name is the second item, and e.salary is the third item. When a C++ class is written to get e.name, then that name has to be at the same relative location in the object as defined in the class definition. The order of arguments in the class definition and the created object is based upon the ordering of arguments in the FROM clause of the view definition.

Once the objects are built, the objects will exist, i.e., be in memory, for the duration of a transaction (i.e., until a commit or abort). The cache, therefore, must be in sync with the transaction. For a given transaction, and whenever the query engine encounters a view in a query, the query engine will use the two rules described above to determine which objects the query engine needs to build. As such, the query and view are analyzed to determine whether any objects have to be built. Although a view, i.e., a view definition, is created independently of and prior to the execution of the query that references the view, view objects are not built until a query is received that references the view. When a view is defined, the user defines the view type objects. Upon receipt of a query that references the view, the query engine will build objects, if needed, of the view type at run-time.

There are two separate activities/actions that are required in implementing a preferred embodiment of the invention. One involves view definition time, e.g., via a tool using an object oriented language implementation, or directly by a user; and the other involves query run-time.

A programmer writing an application (in an object-oriented language, e.g., C++) may desire to retrieve, via views specified by the programmer, data from a relational database. In order to specify a view, a GUI tool could be used to help the programmer generate view definitions. Typically, these view definitions will be expressed in terms representative of an "assembly level," but other GUI type tools could be used by users. For example, GUI tools could be used which would allow users to draw lines to show relationships among attributes, rows, tables, etc. Then, when the view definitions are generated and compiled by the system, the view definitions are used to generate the programming class definitions which are used in writing the application. The programmer could interact with another tool to turn the programmer's view definitions into the object language (e.g., C++) class definitions, i.e., the programming definitions. For a given view definition, the generated object language class definitions must have a specific format. For example, arguments must appear in the same order as in the view definition. The format of the object language representation will support the delegation, to underlying objects, of attributes, values, methods, etc., that are directly capable of being delegated. In the case where a query is involved in the view definition, then the method itself within the class definition will contain the query. At run-time the view definitions have to already exist. When the system receives the view definition, from whatever source, the query engine will generate the structure of the view type objects, and instances of the view objects. The structure is dictated by the view definitions and the two rules stated above.

For example, at run-time, a query such as "select e from view employee collection (VEmp) e" may be received. The system will analyze view employee and determine that it is a view built upon a view type. To return a result to the application, the system has to return to the application handles on view type objects that look like object language (e.g., C++) objects in the lo memory. At some point in the query evaluation, the system will build the objects in the memory from the view definition object. The system finds the view definition object from the catalogs of the query engine. The query engine will create application objects as a result of the query. When the query returns, the user/application will have in memory a collection of view objects that correspond to the view type objects. Iterating over each object, the user/application can run methods on the object to get a result. For example, the get salary method can be run on each instance in the collection of employee objects to get the salary of each employee.

The application uses its class definition to know what the application is getting back. The application may get back pointers to other attributes/view type objects, etc. The class definition tells the application what pointer to use to get the desired attribute (e.g., salary). The application program includes these class definitions in a file.

The model being created is that although the data is being retrieved from a relational database, the illusion is of an object oriented database manipulating application objects in the memory. The objects from the database are really the application's objects; and if the application is written in the C++ object-oriented language, C++ application objects are what appear to be in the memory. In essence, the user gets the impression that results are being returned from an object oriented database.

The following is a process flow and program flow for object building discussed above including applying query rewrite transformation technology for object building which is further discussed below.

Step 1:
  Compile the user's query into the query graph.
Step 2:
  Compile into the query graph all views and view types that are referenced in the user's query or in view types such that the leaves of the query graph contain only base collections (collections that are not views).
Step 3:

```
For each correlations q in the query graph that is over view
types do begin
  for each columns qc in q do begin
    if qc is a handle on a correlation q or
      qc is a path expression that involves a method do begin
        /*
``` e.g. ref e, or simply a correlation e appearing as
  a column expression in the query or
  a path expression with a method such as
  e.earned_vacation( )
*/
- replace qc with build_object
- set the parameters of build_object as follows:
  for each correlation r in the view type that implements
    q do begin
    if r is a view type then begin
      add r to the argument list
    end else begin
      /*
      r is a table type (or database row)
      - add build_row to the argument list
      - for each column c in the table type of r do begin
        add c to the argument list of build_row
      end
    end
  end
- if qc was a path expression with a method then
    add the path expression following the function call to
      build_object
  end else begin
    apply other known rewrite transformations to qc
  end
end
end Step 4:
  if any views remain in the query graph then goto step 3
Query Rewrite Optimizations
  Query Pushdown
  In the context of an object query service, query pushdown is the notion of taking an object query and determining what parts of it can be migrated through the layers of the object schema to the database(s) where the data resides. The objective is to use the power of the database query function to do data filtering; thereby restricting the amounts of data that have to be moved into object space.

Query pushdown includes all of the predicates that define a query's result. In this case the task of restricting the result set is entirely performed by the databases where the data resides. Predicate pushdown can include partial predicates that define a query's results. In this case, some of the predicates (i.e., a subset of the conjuncts that define a query's result) are passed down to the databases where the data resides thereby restricting the results returned by these databases. The remaining predicates that could not be pushed down are applied in object space by the query evaluator. Finally, if predicate pushdown cannot be applied, the predicates that define a query's results are applied in object space after having retrieved the complete sets of data referenced in the query.

In the case of predicate evaluation in object space, either a predicate can be applied without engaging object building (or reactivation), or object reactivation needs to be performed before the predicate can be applied. Object reactivation is necessary if a predicate involves a method (e.g., e.earned_vacation () >10), or involves a function that references business objects as function arguments (e.g., earned_vacation (e) >10).

In one example, a result set can be restricted, by a database where the data resides, for predicates that can be pushed down to the database. If, for example, the query is select e.name from employee business object e where salary is greater than 100,000, no objects need to be built to render the result.

In another example, remaining predicates, that define the query's results, may be applied in object space after retrieving complete sets of data referenced in the query. For example, for the query "select * from employee business object e where e.name is greater than McHenry" there may be a collation sequence difference between tier two and the database on tier three. In this case, the predicate may be run in the memory although no object creation is needed to resolve that predicate.

Determining If objects Need to be Built

In one embodiment, objects would always be built for any query referencing a view. No query rewrite optimization is performed in order to eliminate the building of objects. In a preferred embodiment, query rewrite optimization techniques are performed in order to eliminate the building of objects for some queries. As such, relational rewrite optimization techniques are applied in a framework where objects may have to be built in the query results. The query and its views are analyzed according to the following:

1) If a query does not request a handle on an object, and does not reference a method, but only asks for values, e.g., as illustrated in FIG. 5; then the query is totally given to the database management system at tier three, after rewriting the query using typical relational rewriting techniques. No object building is performed for this query even though the original query references a view.

2) However, even if the query falls into the category of queries discussed in 1) above, some parts of the query may be resolved in the memory of the object query engine at tier two if the query raises collation sequence issues. A collation sequence may arise if, for example, the database management system at tier three has different semantics involving alphabetical sequences than the system at tier two. That is, an order by clause or a predicated specifying an attribute is less than a value, e.g., name<R, would result in different answers depending upon where, tier two or tier three, the query is resolved. For example, a database following the semantics of US English may put numbers before letters such that A1 would come before AA. Other language databases may put letters before numbers such that AA would come before A1. As such, the query engine in the object query service may follow one set of semantics while the database on tier three follows another set of semantics. Regardless of whether the results are returned from tier two or tier three, the results should be the same. If they cannot be, due to differences in the semantics being followed, the next best resolution is to have the results be consistent with the machine that the query is being run on, i.e., submitted to, such as the object query service at tier two. In this type of situation, at least part of the query would be resolved in memory at tier two, instead of pushing that part of the query all the way down to the database management system at tier three. There is no collation sequence issue if the query requests a name that is equal to a value. However, there may be a collation sequence issue if the query requests a name that is less than or greater than a value. If the object query service knows that the semantics are the same, then push down can occur. If the object query service does not know whether or not the semantics are the same, or knows that they are not, then the query engine at the object query service will not push the predicate to the database management system at tier three, but will resolve it within its own memory. Therefore, even if the query is a simple query that can be translated into a relational query, some of its predicates may still be resolved in the memory of the object query service.

3) If a query traverses a reference type attribute, but it can be transformed into a join operation between relational tables, no object building is required, as shown in FIG. 6.

4) Object building is required if a query returns a handle on an object, or references a method. A method may not be referenced explicitly in a query, but a mapping of columns may map to a method of another view type, thereby bringing in a method implicitly. In other cases, some attributes may not be mapped, and it is not known how they are derived, so object building will be required.

The examples below show queries on views where the query is optimized, via query rewrite, so that objects do not necessarily have to be built. Typically, it is expensive (in terms of computer resources and response time) to build objects. For some queries, the query answer can be returned without ever building any objects. As such, it is desirable to apply query rewrite optimization techniques to the query in order to avoid building objects if possible.

In the first example as shown in FIG. 5, a query is given for which object building is not required. The user/application on tier one would have a proxy to the query evaluator. The application would issue a query through the query evaluator such as "select v.no, v.name from VEmp," and would retrieve an iterator i over the result. This query would be submitted from tier one, and as a result a view or collection of view type objects would be returned. This query can be completely pushed down to the database, therefore no object creation is needed to resolve the query. The query does not ask for a handle on a view type of department object. This query is in the realm of relational style queries over views. However, if the predicate stated "v.name<A", then the query system may have chosen to run the predicate in the memory because it may have a concern whether the collation sequence in the tier two server running on a workstation is the same as the collation sequence in tier three. Although object creation may still not be needed, the predicate may be evaluated in memory by asking for the value of the string which represents the string.

As described above, the sample query in FIG. 5 is an "ad hoc" query that retrieves department numbers and names from the view collection VDept. It is ad hoc in the sense that it returns values, instead of objects. It can be resolved from the meta data alone (i.e., it does not engage object building or generated code to build business objects). After query rewrite transformations have been applied, the resulting query can be submitted to a relational DBMS.

In the second example, as shown in FIG. 6, the query is similar to the query shown in FIG. 5 in the sense that the query is not asking for a handle on any object, which makes it amendable to query optimization. It is another ad hoc query because it will return values instead of objects. However, the query shown in FIG. 6 is more complicated than the query shown in FIG. 5 because it involves path traversal, i.e., navigation, e.g., "e.dept..name". The query shown in FIG. 6 is a query that traverses a reference type attribute.

The schema of the object states that department is a pointer, so the user has the illusion of navigating through the pointer. Actually there is no such pointer, because there are just two tables, Employee and Department. The query can be rewritten into a relational query, and can be completely pushed down to the database on tier three.

The query selects employees' names and their respective department names. An employee's department name is obtained using the expression e.dept..name that traverses the reference to an instance of VTDept to retrieve the department's name. The first step shows the transformation of the path expression into the subquery. The second step performs a transformation of the subquery into a join expression as an optimization. The subquery was captured from the metadata as the implementation of the derivation for the reference member involved in the path expression. The optimization that then leads to step 2 is possible due to the fact that the foreign key edid is declared as not null.

Between step 1 and step 2, the subquery is collapsed into a join due to the metadata information that pointer e.edid designated as the foreign key is not null. This query actually has an outer join semantic. The interpretation is that if an employee has no department, then the employee should still come out as a result with the department name being null. If this is transformed into a join, and if an employee does not have a department, then there will be no match on d.dno, and the employee will disappear from the result. Due to the fact that e.edid is not null, then it is not possible for an employee to have a null value for a department reference in the database. Therefore, there is no employee without a department. Therefore, the query can be transformed into an outer join.

The transformed query given in step 2 can be submitted to a relational DBMS. The database management system on tier three will run the query and return results to the user which will match what the user asked for, i.e., employee name and department name.

As shown in FIG. 6, the query uses navigation through pointers. Behind this is pushdown technology in which a predicate is expressed against a higher level object. The predicate will then be rewritten against the real data, wherever the data resides, in order to optimize the query. For example, to find employees with e.no less than 10, one approach is to ask the department object for all of the departments. A more efficient way, is to tell the database to only get the department numbers less than 10. Pushdown allows the database to use its indexes and its other technology to minimize the amount of data that has to be transferred back. Even with object building, the predicate can still be pushed down to the database. Such optimization allows an object server to show good performance for selected queries. For large databases, optimization minimizes the amount of data in memory in a server, such as an NT server on tier two.

The query in FIG. 7 retrieves employee business objects from the VEmp view collection. VEmp is a collection of view type employee object. A handle is desired on these objects as the result. The query requests a handle on business objects as results by using "ref e", which unambiguously states that a handle e is desired on the objects VEmp pointed to by e. In other words, "ref e" means "a handle to an object in the VEmp view collection bound to correlation e."

Object building is required in order to render the query result, but some optimization can still be performed. For example, the predicate e.no <10 can be pushed down to the database management system on tier three. As such, object building only has to be done on those employee objects whose number is less than 10.

Although the query is to return business objects, the query's predicate e.no <10 can be rewritten as an expression over table db2emp. The data is sent to the build_object function to create the business object.

A skeleton of the query plan implementation of the rewritten query generated by the plan optimizer is given. The SQL SELECT statement contains the projection elements needed for building the db2emptable type. The query also contains the predicate that restricts the results to those having e.eno <10. The result is retrieved in collection s1. For each element e in collection s1, the corresponding object is created by build_object to render the business object. The created business object e1 is added to the result collection "result". Note that while this query plan uses temporary collections to resolve the query, future support for demand driven execution would not use such collections.

The query in FIG. 8 has a predicate that is invoking a business object method, as indicated by () in JAVA and in C++, "e.earned_vacation () >14". In order to apply the predicate, there must be a business object referencing another business object, i.e., ref e. But there is another predicate e.no <10 that can be pushed down. There are different type of rewrite rules involved in this query.

FIG. 8 shows a query that requires object building to take place to render application view type objects as query results and to evaluate methods on view type objects. The build_object call appears twice in the rewritten query: 1)to render the query result as application objects, and 2) to run the earned_vacation method. Since the build_object function returns a reference to an object, the earned_vacation method appears in a path expression that starts with the function call. However, the predicate involving "earned_vacation" has to be evaluated in the memory at tier two since it is not understood by the database system at tier three. Nevertheless, the predicate "e.eno <10" is applicable by the database system at tier three and is used to reduce the number of results that flow from tier three back to tier two in order to compute the query's result.

The following is a process flow and program flow for query optimization rules for query pushdown for queries that require object building. The following illustrates the interaction between object building and query pushdown.

```
for each correlation q in the rewritten query
    that involves a table in a relational database db do begin
    /*
    prepare a SQL query for db as follows
    */
    create a FROM clause for the query:
      - add a reference to q in the from clause
    creat a WHERE clause for the query:
      - for each predicate that involves q do begin
        if all other correlations qi aside from q
          that are involved in the predicate
          are also from tables that reside on db then begin
          if the predicate can be handled by the relational DBMS
          then begin
            -add the predicate as a conjunct in the where clause
            /*
            Note that predicates that include object building
            are excluded
            */
            mark the predicate as "processed"
          end
        end
      end
    create the SELECT clause for the query:
      - for each column c of the table bound to q do begin
        if c is referenced in the query's unprocessed
predicates or anywhere
      else
        in the query then
        - add c to the projection list
      end
    end
end
```

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, cpu, memory/storage devices, communication links, communication/transmitting devices, servers, I/O devices, or any subcomponents or individual parts of one or more processing systems, including software, firmware, hardware or any combination or subcombination thereof, which embody the invention as set forth in the claims.

One skilled in the art of computer science will easily be able to combine the software created as described with appropriate general purpose or special purpose computer hardware to create a computer system and/or computer subcomponents embodying the invention and to create a computer system and/or computer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims. For example, although the preferred embodiment has been described in terms of a three tier client server environment, the invention could also be implemented in a two tier client server environment or other environment including where the application, object query service, and the data source all reside on a same machine. Also, although the preferred embodiment has been described with reference to a relational database, the invention is applicable for use with any type of data source, including but not limited to hierarchical data, (e.g., DL/1), object-oriented data, flat files, VSAM (Virtual Storage Access Method), etc.

We claim:

1. A query system comprising:
    a query engine having a capability to build objects in a memory based upon a view type referenced in a query received from an application; and
    means for applying query rewrite optimizations to the query referencing the view type, wherein the query rewrite optimizations determine which portions of the query to push down to a database at a second tier for resolution and which portions of the query are to be processed by the query engine at a first tier to build objects from the view types.

2. The system of claim 1 further comprising:
    means for building objects if the query requests a handle; and
    means for pushing down some of the predicates of the query to the database management system to restrict the results and thereby the number of objects that have to be built to resolve the query.

3. The system of claim 1 wherein the means for applying query rewrite optimizations further comprises:
    means for analyzing the query to determine if the query requests a handle on an object or references a method.

4. The system of claim 1 further comprising:
    means for giving all of the query to a data source to resolve without performing any object building, even though the query references the view type, if the query does not request a handle on an object and if the query does not reference a method.

5. The system of claim 1 wherein the means for applying query rewrite optimizations further comprises:
    means for analyzing the query to determine if the query requests a handle on an object, or if the query references a method, or if the query raises a collation sequence issue.

6. The system of claim 1 further comprising:
    means for giving part of the query to a data source to resolve without performing any object building, even though the query references the view type, if the query does not request a handle on an object and if the query does not reference a method; and
    means for resolving a remaining part of the query that raises a collation sequence issue in the memory of the query engine.

7. The system of claim 1 wherein the means for applying query rewrite optimizations further comprises:
    means for rewriting the query, if the query traverses a reference type attribute, into a join or outer join operation between relational tables; and
    means for resolving the rewritten query without performing object building.

8. The system of claim 1 wherein the means for applying query rewrite optimizations further comprises:
    means for submitting the rewritten query to a data source without object building if the query referencing the view type only requests values to be returned.

9. A query system comprising:
    means for building objects in memory based upon a view type referenced in a query received from an application; and
    means for applying query rewrite optimizations to the query referencing the view type, wherein the query rewrite optimizations determine which portions of the query to push down to a database at a second tier for resolution and which portions of the query are to be processed by the query engine at a first tier to build objects from the view types.

10. The query system of claim 9, wherein the means for applying query rewrite optimizations comprises:
    means for restricting a result set, by a database where the data resides, for predicates that can be pushed down to the database;
    means for building an object in memory, before applying remaining predicates, that cannot be pushed down, in object space if the remaining predicates involve a method, or if the remaining predicates involve a function that references objects as function arguments; and means for applying the remaining predicates, that define the query's results, in object space after retrieving complete sets of data referenced in the query.

11. A query system comprising:

means for receiving at the query system at a first tier a query that either invokes a method on a view type or requires a view type to be returned as a result;

means for determining at the query system which predicates in the query are to be pushed down to a database at a second tier to be resolved; and means for applying at the query system the remaining predicates in the query in object space, which comprises determining which objects, based upon view type definitions of view types referenced by the query, are to be built by the query system.

12. A program having computer readable program code means on a computer usable medium, the program comprising:

means having a capability to build objects in a memory based upon a view type referenced in a query received from an application; and means for applying query rewrite optimizations to the query referencing the view type, wherein the query rewrite optimizations determine which portions of the query to push down to a database at a second tier for resolution and which portions of the query are to be processed by the query engine at a first tier to build objects from the view types.

13. The program of claim 12 further comprising:

means for building objects if the query requests a handle; and means for pushing down some of the predicates of the query to the database management system to restrict the results and thereby the number of objects that have to be built to resolve the query.

14. The program of claim 12 wherein the means for applying query rewrite optimizations further comprises:

means for analyzing the query to determine if the query requests a handle on an object or references a method.

15. The program of claim 12 further comprising:

means for giving all of the query to a data source to resolve without performing any object building, even though the query references the view type, if the query does not request a handle on an object and if the query does not reference a method.

16. The program of claim 12 wherein the means for applying query rewrite optimizations further comprises:

means for analyzing the query to determine if the query requests a handle on an object, or if the query references a method, or if the query raises a collation sequence issue.

17. The program of claim 12 further comprising:

means for giving part of the query to a data source to resolve without performing any object building, even though the query references the view type, if the query does not request a handle on an object and if the query does not reference a method; and means for resolving a remaining part of the query that raises a collation sequence issue in the memory of the query engine.

18. The program of claim 12 wherein the means for applying query rewrite optimizations further comprises:

means for rewriting the query, if the query traverses a reference type attribute, into a join or outer join operation between relational tables; and means for resolving the rewritten query without performing object building.

19. The program of claim 12 wherein the means for applying query rewrite optimizations further comprises:

means for submitting the rewritten query to a data source without object building if the query referencing the view type only requests values to be returned.

20. A program having computer readable program code means on a computer readable medium, the program comprising:

means for receiving at a query system at a first tier a query that either invokes a method on a view type or requires a view type to be returned as a result;

means for determining at the query system which predicates in the query are to be pushed down to a database at a second tier to be resolved; and means for applying at the query system the remaining predicates in the query in object space, which comprises determining which objects, based upon view type definitions of view types referenced by the query, are to be built at the query system.

21. A method implemented in a query system, the method comprising:

providing a query engine having a capability to build objects in a memory based upon a view type referenced in a query received from an application; and applying query rewrite optimizations to the query referencing the view type, wherein the query rewrite optimizations determine which portions of the query to push down to a database at a second tier for resolution and which portions of the query are to be processed by the query engine at a first tier to build objects from the view types.

22. The method of claim 21 further comprising:

building objects if the query requests a handle; and pushing down some of the predicates of the query to the database management system to restrict the results and thereby the number of objects that have to be built to resolve the query.

23. The method of claim 21 wherein the step of applying query rewrite optimizations further comprises:

analyzing the query to determine if the query requests a handle on an object or references a method.

24. The method of claim 21 further comprising:

sending all of the query to a data source to resolve without performing any object building, even though the query references the view type, if the query does not request a handle on an object and if the query does not reference a method.

25. The method of claim 21 wherein the step of applying query rewrite optimizations further comprises:

analyzing the query to determine if the query requests a handle on an object, or if the query references a method, or if the query raises a collation sequence issue.

26. The method of claim 21 further comprising:

sending part of the query to a data source to resolve without performing any object building, even though the query references the view type, if the query does not request a handle on an object and if the query does not reference a method; and resolving a remaining part of the query that raises a collation sequence issue in the memory of the query engine.

27. The method of claim 21 wherein the step of applying query rewrite optimizations further comprises:

rewriting the query, if the query traverses a reference type attribute, into a join or outer join operation between relational tables; and resolving the rewritten query without performing object building.

28. The method of claim 21 wherein the step of applying query rewrite optimizations further comprises:

submitting the rewritten query to a data source without object building if the query referencing the view type only requests values to be returned.

29. A method implemented in a query system, the method comprising:

building objects in memory based upon a view type referenced in a query received from an application; and applying query rewrite optimizations to the query referencing the view type, wherein the query rewrite optimizations determine which portions of the query to push down to a database at a second tier for resolution and which portions of the query are to be processed by the query engine at a first tier to build objects from the view types.

30. The method of claim 29, wherein the step of applying query rewrite optimizations further comprises:

restricting a result set, by a database where the data resides, for predicates that can be pushed down to the database;

building an object in memory, before applying remaining predicates, that cannot be pushed down, in object space if the remaining predicates involve a method, or if the remaining predicates involve a function that references objects as function arguments; and applying the remaining predicates, that define the query's results, in object space after retrieving complete sets of data referenced in the query.

31. A method implemented in a query system, the method comprising:

receiving at the query system at a first tier a query that either invokes a method on a view type or requires a view type to be returned as a result;

determining at the query system which predicates in the query are to be pushed down to a database at a second tier to be resolved; and applying at the query system the remaining predicates in the query in object space, which comprises determining which objects, based upon view type definitions of view types referenced by the query, are to be built at the query system.

* * * * *